United States Patent
Gibbs et al.

(10) Patent No.: US 6,724,735 B1
(45) Date of Patent: Apr. 20, 2004

(54) DIGITAL RADIO

(75) Inventors: Jonathan Alastair Gibbs, Southampton (GB); Richard Lucas, Ash Vale Hampshire (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/497,020

(22) Filed: Feb. 2, 2000

(30) Foreign Application Priority Data

Jun. 30, 1999 (GB) .............................................. 9915280

(51) Int. Cl.[7] .................................................. H04J 3/00
(52) U.S. Cl. ...................................... 370/280; 370/294
(58) Field of Search ................................ 370/276–280, 370/294, 336, 337, 345, 347, 437, 442, 465; 455/522; 375/219, 377

(56) References Cited

U.S. PATENT DOCUMENTS

| | | | | |
|---|---|---|---|---|
| 5,379,279 A | * | 1/1995 | Backof et al. | 370/280 |
| 5,504,773 A | * | 4/1996 | Padovani et al. | 375/130 |
| 5,602,836 A | * | 2/1997 | Papadopoulos et al. | 370/280 |
| 5,802,046 A | * | 9/1998 | Scott | 370/280 |
| 6,088,337 A | * | 7/2000 | Eastmond et al. | 370/280 |
| 6,175,738 B1 | * | 1/2001 | Flake et al. | 455/451 |
| 6,393,007 B1 | * | 5/2002 | Haartsen | 370/337 |
| 6,477,176 B1 | * | 11/2002 | Hamalainen et al. | 370/435 |
| 6,496,706 B1 | * | 12/2002 | Jou et al. | 455/522 |

* cited by examiner

*Primary Examiner*—Ajit Patel
*Assistant Examiner*—Yvonne Q. Ha
(74) *Attorney, Agent, or Firm*—Steven R. Santema; Valerie M. Davis

(57) ABSTRACT

The invention concerns a digital radio (2) for pseudo-duplex radio communication, and a method of transmission time mediation for pseudo-duplex radio communication.

A digital radio (2) is in time division duplex communication with a second digital radio (4) over a single radio channel. Control of the radio channel may reside with either radio. However, authority for a radio to change the frame format in order to increase the proportion of time for which it transmits always resides entirely with the radio currently transmitting the least per frame. This arrangement allows rapid response to a need for a radio to move from listening to speaking mode, thereby reducing speech clipping.

When the digital radio (2) and the second digital radio (4) are transmitting for equal proportions of the frame, authority to change the frame format passes to the radio that is transmitting at that instant.

The apparatus and method of the invention provide rapid switching of transmission mode, with minimal speech clipping when a user of the radio (2) starts to speak.

17 Claims, 3 Drawing Sheets

DIGITAL RADIO

TECHNICAL FIELD

The present invention relates to the field of radio communication systems.

BACKGROUND

Digital portable and mobile radios may be arranged either to communicate with one another via base stations, or directly with one another in 'direct' mode. The communication will typically either be over a digital simplex communication channel, or over a digital semi-duplex communication channel.

FIG. 1 illustrates the general scheme of a personal mobile radio (PMR) system 10. Portable radios 2, 4 and 6 of FIG. 1 can communicate with a base station 8. Radios 2, 4 and 6 could equally well be mobile radios mounted in vehicles. Each of the radios shown in FIG. 1 can communicate through base station 8 with one or more other radios. If radios 2, 4 and 6 are capable of direct mode operation, then they may communicate directly with one another or with other radios, without the communication link passing through base station 8.

Portable and mobile radios may employ a regular payload framing structure. This structure consists of a structure of fixed time points at which parts of the communication begin and end.

Conventionally, in a back-to-back radio system employing a single frequency in a time division duplex fashion to convey duplex voice, each radio utilises the available radio resource for 50% of the time.

However, utilisation of the radio resource for 50% of the time does not take advantage of the time discontinuity of human speech, whereby for the majority of the time, only one of the two parties in the call is speaking at any one time. In addition, when a party is speaking, their ability to judge the quality of the audio being conveyed to them is impaired. This is the principle which allows operation of the so-called pseudo-duplex method, where under normal circumstances the majority of the capacity is devoted to the active speaker and then in periods of double-talk (both speakers active) the system reverts to a conventional Time Division Duplex (TDD) scheme. The present application describes an implementation of the controlling protocol for such a pseudo-duplex scheme.

One of the problems associated with this kind of communications scheme is speech clipping due to the slow response time of the switching from one direction to another as someone begins to speak. The present application addresses this problem.

The closest known technologies relate to Voice Activity Detection (VAD) schemes applied to cellular applications of rate control and discontinuous operation and hands-free speaker-phone control techniques. Voice Activity Detection involves measuring the amount of voice signal currently requiring transmission. When the user of a radio is speaking, the VAD measurement is different from when the user is not speaking, and only background noise is detected.

The VAD in cellular systems is biased in order to ensure that when a party speaks, the radio, including the speech codec and RF circuitry etc., will be active to convey that speech to the other party in the presence of background noise and other impairments. However, this leads to transmission of data when a party is not speaking. The cost of this is slightly lower battery life and slightly increased interference to co-channel users in other cells of the system. These are essentially second (or higher) order effects. In these systems, there is no concept of a finite resource being available to the duplex call. It is entirely possible and consistent for the uplink and downlink, which are almost always on different carriers, to be simultaneously utilising the full bandwidth.

In a speaker phone system, in order to overcome the need for acoustic echo control, the phone may be in 'microphone mode' or 'speaker mode', but never both at the same time. The control algorithm has access to audio signals from the incoming telephone line and the microphone on which to base the decision over which mode to apply at any one time. There is no sense that the speakerphone must convey its decision to another unit since it alone has full control over the decision.

For a pseudo-duplex control scheme, two units must mutually agree on the best channel usage, based upon the activity of the two parties. They must convey their relative VAD measurements to one-another to allow a decision algorithm to be executed jointly. Furthermore, all of this must be done in a controlled manner in the presence of transmission errors which could cause unexpected behaviour.

A need exists to alleviate the problems of the prior art.

DETAILED DESCRIPTION OF THE PREFERRED EMBODIMENT

A digital radio for pseudo-duplex radio communication in accordance with the invention comprises the features of appended claim 1. Another embodiment of the digital radio comprises the features of appended claim 8.

A method of pseudo-duplex digital radio communication in accordance with the invention comprises the steps of appended method claim 14. Another embodiment of the method comprises the steps of appended claim 15.

The present invention provides a framing scheme which alleviates the speech clipping of prior art digital radios. The invention therefore provides enhanced speech quality to a user of a digital radio of the invention.

Figure 1:
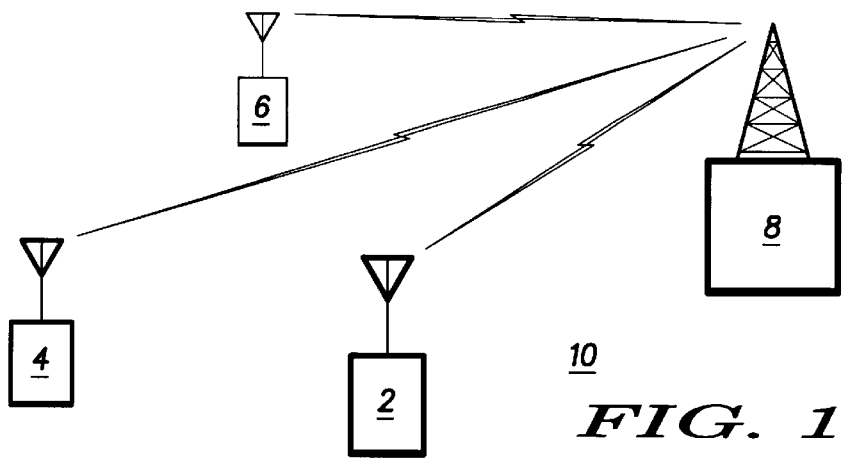
FIG. 1 illustrates an arrangement of portable and/or mobile radios and a base station.
Figure 2:
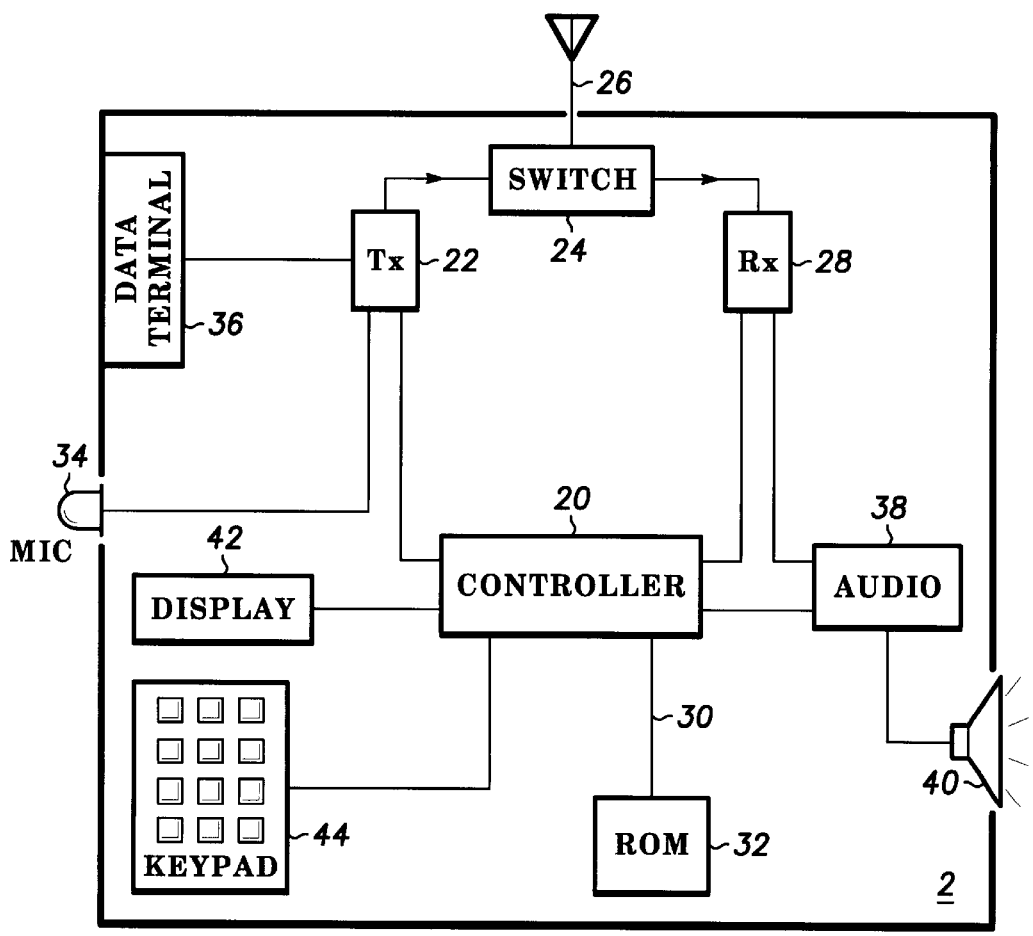
FIG. 2 illustrates a portable- or a mobile radio in accordance with the present invention.

FIG. 2 illustrates a digital radio 2 in accordance with the present invention. The radio of FIG. 2 may be either a portable- or a mobile radio. The digital radio 2 of the invention may be compliant with the DIIS radio standard.

The digital radio 2 of FIG. 2 can transmit speech from a user of the radio. The radio comprises a microphone 34 which provides a signal for transmission by the radio. The signal from the microphone is transmitted by transmission circuit 22. Transmission circuit 22 transmits via switch 24 and antenna 26.

Digital radio 2 also has a controller 20 and a read only memory (ROM) 32. Controller 20 may be a microprocessor. ROM 32 is a permanent memory, and may be a non-volatile Electrically Erasable Programmable Read Only Memory (EEPROM). ROM 32 may contain various different regions of memory.

The digital radio 2 of FIG. 2 also comprises a display 42 and keypad 44, which serve as part of the user interface circuitry of the radio. At least the keypad 44 portion of the user interface circuitry is activatable by the user. Voice activation of the radio, or other means of interaction with a user, may also be employed.

Signals received by the radio are routed by the switch to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26.

The digital radio 2 of the invention may be used in 'direct mode', to communicate directly with other portable or mobile radios, without the communication link passing through a base station. However, digital radio 2 may communicate via a base station 8 of a radio network with other radios, or through the telephone system (POTS). Digital radio 2 is designed to be able to operate over a single channel communication link, in pseudo-duplex communication. So digital radios of the invention may communicate over a direct mode radio channel. However, the single radio channel may link the first digital radio to the second digital radio via a base station.

Figure 3:
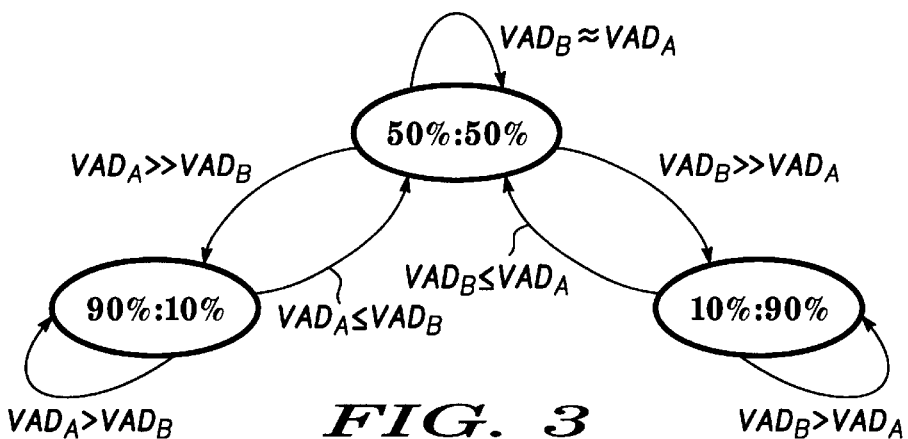
FIG. 3 illustrates an idealised state diagram for communication between two digital radios, communicating over a single radio channel.

FIG. 3 shows a state diagram illustrating modes of communication between two digital radios communicating over a single radio channel. The state diagram also illustrates permitted changes between the modes of communication. FIG. 3 is an idealised picture. Suffixes A and B in FIG. 3 refer to 'Party A' and 'Party B', the first and second digital radios respectively.

The three ovals in FIG. 3 are marked with the percentages of the time on the single radio channel for which the two radios are transmitting. For example, the oval towards the lower left of the figure indicates that the first radio is transmitting for 90% of the time. The second radio, with which the first radio is communicating, is transmitting on the single radio channel for the remaining 10% of the time. This proportion of the transmission time leaves the second radio only enough time to transmit 'silence' descriptors. These indicate to the first radio that there is no signal activity by the user of the second radio, only background noise.

In the applicants' practical version of a time division duplex radio, the proportions of time for transmission and reception are actually closer to 20% and 80%, when one party has speech to transmit, and the other party has silence. However, the 10%:90% apportioning of time shown in FIG. 3 illustrates the principle of the arrangement clearly.

The arrows on FIG. 3 indicate possible routes by which the 'system' of the two radios can transition from one communication state to another. Thus the system can transition directly from the state described in the lower left oval to the state shown in the oval towards the upper centre of the figure. In this latter state, both the first and the second radios are transmitting for 50% of the time. However, the system has to pass through the 50%:50% state when transitioning from 90%:10% to 10%:90%.

In general terms, a system of two radios can be made to function with a proportion of transmit: receive time chosen from a fairly wide range, in fact of X% (100−X)%, where 0<X<50%. In the situation where one radio has speech to transmit, and the radio with which it is communicating has none, a value of X closer to 0 than 50 in this inequality provides clearer speech transmission.

The inequalities written next to each arrow on FIG. 3 give the conditions under which each state transition can occur. For example, the transition from the 10%:90% state to the 50%:50% state occurs if the value of VAD for the first radio (Radio 'A' on FIG. 3) is less than or equal to the value of VAD for radio B.

The decision making process indicated in the arrangement of FIG. 3 requires instant, precise knowledge by each radio of the VAD values held by both radios. However, this is not practicable. There are two problems associated with the ideal scheme of FIG. 3:

(i) Firstly, the VAD information must in practice be conveyed over an error prone channel from party A to party B and vice-versa.

(ii) Secondly, each party should have early warning of the most likely transmission modes so that speech coding in the radio, which has an inherent processing delay, can be performed at the appropriate rate. This problem may be solved by ensuring that both parties have visibility of the VAD decisions as early as possible.

There are two mechanisms by which problem (i) above can be solved:

(a) The simplest solution to this problem is for the two radios to send their respective raw VAD values to each other, and to acknowledge receipt of the VAD value from the other party. There must also be visibility of the current 'state' of the link with this mechanism. This allows prediction of the actual future impact of VAD values in order to implement a state transition model such as FIG. 3 reliably. One of the members of the link is designated the master and they action the appropriate format for the link (90:10, 50:50 or 10:90) for the next frame.

A 'soft' voice activity detector may be used to decide whether there is signal activity at a radio for transmission to the other radio. A 'soft' voice activity detector is one which gives a range of values, each indicating the likelihood that there is voice signal for transmission by the radio.

Consider each radio to be using a soft decision VAD which provides a 2-bit binary output which can take the values 0, 1, 2 or 3. Here 0 represents silence with high confidence and 3 represents active speech with high confidence. A scheme could be used where the difference between the values of VAD held by each radio was used to decide on the proportion of the total transmission time over the single radio channel available to each radio. A simple VAD-difference scheme would have 7 possible states of −3 to +3. Then, for example, the state transitions could be driven from the 50%:50% state to the 90%:10% state when the VAD difference values ≧+2, and to the 10%:90% state when the VAD difference values ≦−2. Other state transitions would require other thresholding.

(b) The second possible solution is for each party to repeatedly transmit an overall soft "VAD-direction" (VADDir) value at given times from one to another, in such a way as to include the value heard from the other unit plus a correction due to its own soft VAD value.

In its simplest form this could be a simple VAD difference ($VAD_1 - VAD_2$) moving backwards and forwards. However, it is possible, and indeed desirable, to arrange for a more complex integrating mechanism which embodies a state memory, in order to implement a more complex protocol as in FIG. 3. A state memory means that the current value of VADDir is dependent on both present and former conditions.

The integrating mechanism could, for example, work as follows, and could independently omit the need for state monitoring. Consider the same 2-bit soft VAD (as described above) being processed by the two parties, the first radio and the second radio, using a pair of simple algorithms, respectively:

Party A (First radio):

If the received $VADDir_B>0$, then set $VADDir_A=VADDir_B+VAD_A-2$

Otherwise set $VADDir_A=VADDir_B+VAD_A-1$

But if this makes $VADDir_A>3$, then set $VADDir_A=3$

Party B (Second radio):

If the received $VADDir_A<0$, then set $VADDir_B=VADDir_A-VAD_B+2$

Otherwise set $VADDir_B=VADDir_{A-VAD_B}+1$

But if this makes $VADDir_B<-3$, then set $VADDir_B=-3$

The value of VADDir is sent by each radio to the other after each VAD exchange and the value of VADDir is thresholded to yield the state of the link at any one time. An appropriate thresholding scheme would be:

If $(VADDir \geq +2)$ Use 90%:10%

If $(-2<VADDir<+2)$ Use 50%:50%

If $(VADDir \leq -2)$ Use 10%:90%

It is easy to show that the above scheme implements the algorithm of FIG. 3 by examining the state transition table of Table 1 below. Table 1 shows state transitions for the first radio 2, in dependence on the values of $VADDir_1$ which it derives from its own VAD value, and the value VADDir of VADDir received from the second radio 4.

TABLE 1

Next $VADDir_A$ State Values

|  |  | $VAD_A$ | | | |
| --- | --- | --- | --- | --- | --- |
|  |  | 0 | 1 | 2 | 3 |
| Received $VADDir_B$ Value | +3 | +1 | +2 | +3 | +3 |
|  | +2 | 0 | +1 | +2 | +3 |
|  | +1 | -1 | 0 | +1 | +2 |
|  | 0 | -1 | 0 | +1 | +2 |
|  | -1 | -2 | -1 | 0 | +1 |
|  | -2 | -3 | -2 | -1 | 0 |
|  | -3 | -3 | -3 | -2 | -1 |

90%:10% Mode (upper right)
50%:50% Mode (central)
10%:90% Mode (lower left)

This table shows each of the seven possible values of VADDir from -3 to +3 which the radio can receive. Each of these values occupies the first cell of one of the rows. The four possible values of $VAD_1$ from 0 to +3 are shown along the top of the table, each at the head of a column. The entries in the table show the new value of $VADDir_1$ which would result from the received $VADDir_2$ shown at the left of the row, and the $VAD_1$ value shown at the top of the column.

The shaded area at the upper right of the table indicates the new values of VADDir which would cause the radio to operate in the 90%:10% mode.

The shaded area at the lower left of the table indicates the new values of VADDir which would cause the radio to operate in the 10%:90% mode.

The white central zone of the table leading from the upper left to the lower right contains VADDir values between +1 and -1. These are the new values of VADDir which would cause the radio to operate in the 50%:50% mode.

Thus table one illustrates one practical example of an algorithm allowing values of VADDir sent from one radio to the other to control the proportion of the time for which each radio transmits and receives on the single radio channel.

When the first radio 2 has calculated a value for $VADDir_A$, the first radio then transmits this value to the second radio 4. The second radio 4 then uses its algorithm, that explained as 'Party B' above, to update its value of VADDir using the value of $VADDir_1$ received. The second radio 4 then has an updated value $VADDir_2$ of VADDir which it transmits back to first radio 2. This cycle repeats.

Figure 4:
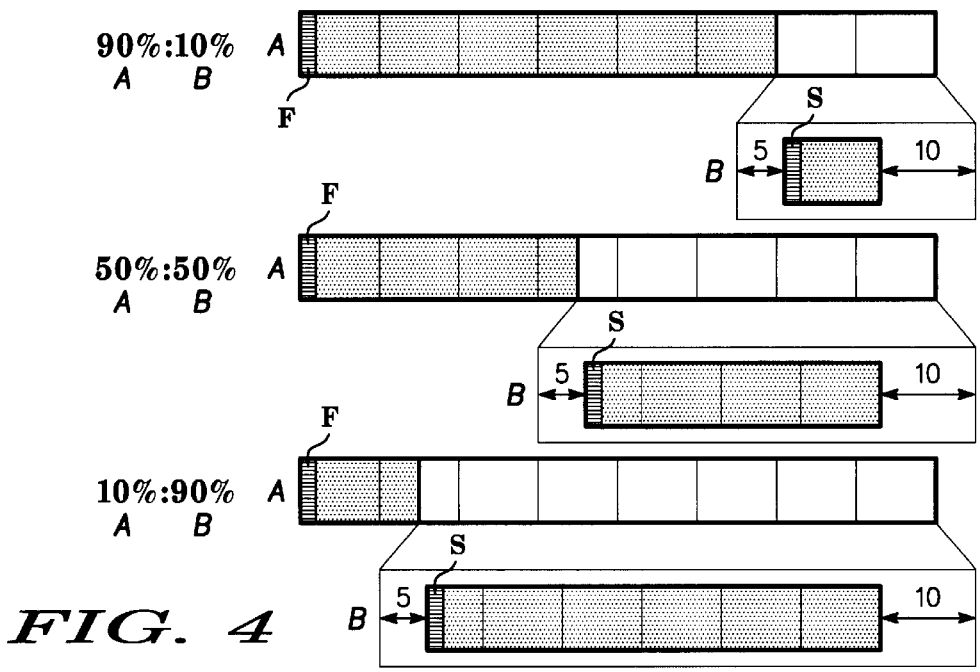
FIG. 4 illustrates a frame structure which could be used for communication between two digital radios.

FIG. 4 shows three frame structures which could be used for communication between two digital radios.

The frame shown as the upper trace in FIG. 4 shows roughly 80–90% of the transmission time being available to radio A, with roughly 10–20% of the transmission time available to radio B.

The frame shown as the middle trace of FIG. 4 shows radio A and radio B each having roughly 50% of the transmission time.

The frame shown as the lower trace in FIG. 4 shows roughly 10–20% of the transmission time being available to radio A, with roughly 80–90% of the transmission time available to radio B.

In FIG. 4, radio A transmits before radio B in each of the three frame formats. In fact, the arrangement of FIG. 4 is such that radio A has full control of the transmission link between radios A and B. This means that the choice of frame structure, the synchronisation and timing are all under the control of radio A.

The applicant has perceived a disadvantage to the arrangement of frames shown in FIG. 4.

Consider a frame of the form shown in the upper trace on FIG. 4. Consider also the possibility that the user of radio B starts to speak just after the transmission slot for radio A has begun. In this case, the VAD value for radio B will rise. With the soft decision function explained above, it may reach value VAD=+3.

However, radio B cannot interrupt the transmission by radio A. Radio B has to wait for the end of radio A's long transmission slot, before radio B can request more transmission time. If A grants the request, the system may move to the 50%:50% transmission time distribution shown in the middle trace on FIG. 4, but will only do this at the start of the next transmission frame at the earliest.

There is therefore a substantial delay in moving to a frame structure giving more than 10% of the transmission time to radio B. The result of this is that some of the speech from radio B will either be lost, or be clipped heavily. Radio A may hear the start of radio B's speech with heavy clipping.

The present invention alleviates the problem associated with radio communication arrangements having the frame formats and control structure illustrated by FIG. 4.

A digital radio 2 for pseudo-duplex radio communication in accordance with the invention comprises:

(i) Signal transmission means 22, 24 for time division duplex signal transmission over a single radio channel.

(ii) Signal reception means 24, 28 for time division duplex signal reception over the single radio channel.

(iii) A controller 20, for controlling the signal transmission means 22, 24 and the signal reception means 24, 28. The controller is adapted to transmit and receive signals in a plurality of pre-defined frame formats, each pre-defined frame format having a pre-defined time division duplex duty cycle. The controller is also adapted to select the particular one of the plurality of pre-defined frame formats for use over the communication link, i.e. the single radio channel.

When the digital radio 2 is in communication over the single radio channel with a second digital radio 4, and the digital radio 2 is transmitting at a lower time division duplex duty cycle than the second digital radio 4, the controller 20 can unilaterally change the particular one of the plurality of pre-defined frame formats selected for use over the communication link. If the digital radio 2 is communicating with a first frame format, then the controller 20 can change this to a second frame format, the second frame format having a higher time division transmitting duty cycle for the digital radio 2 than the first frame format. Importantly, digital radio 2 can do this without consulting the second digital radio 4. This gives the digital radio 2 the ability to act swiftly to change the particular one of the plurality of pre-defined frame formats selected.

Such a change may then be made by the digital radio 2 in response to the user of the digital radio 2 starting to speak, and the VAD value for the radio increasing. The swift response by digital radio 2 minimises loss of the user's speech. The second radio 4 will then perceive reduced clipping in comparison to prior art radio arrangements.

The radio of the invention clearly differs from a radio operating with the frame structure shown in FIG. 4. Crucially, radio 2 has control of the amount of transmission time available to it, even when it is transmitting for less time per frame than the second radio 4.

The invention therefore separates control of the communication link from control of the transmission duty cycle. The radio of the invention will always have control over the transmission duty cycle when it is transmitting for less time than a radio with which it is in communication. The radio of the invention can then decide to use a greater proportion of each frame for transmission, by selecting a second, more advantageous frame structure, without having to await authority from the radio with which it is in communication.

Seen in 'authority' terms, the invention has separated control of the communication link from control of the transmission duty cycle.

In a typical embodiment, consider a first and a second radio in accordance with the invention in communication over a single radio channel. The radio which initiates the call may, for example, retain control of the channel for such matters as synchronisation throughout the duration of the call. However, the power to increase the proportion of time for transmission will always be vested in the radio which currently has the smaller proportion of the transmission time on the channel. This will be either the first or the second radio, depending on which is currently transmitting for less time than the other radio.

Figure 5:
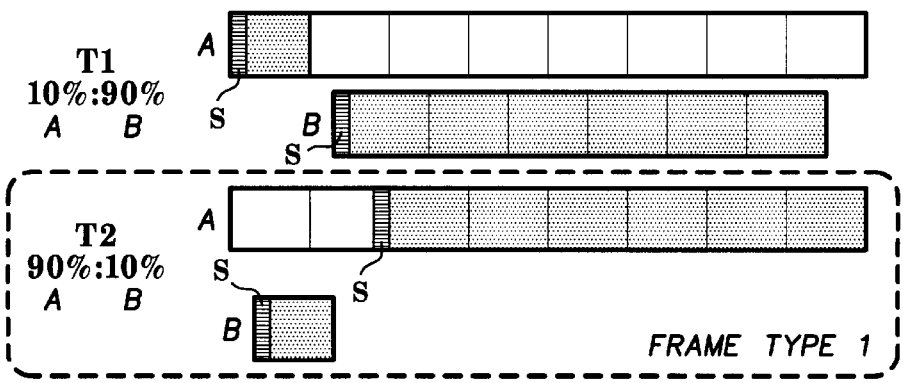
FIGS. 5 and 6 illustrate practical examples of the communication frames for use in ongoing communication between two digital radios, communicating over a single radio channel, in accordance with the present invention.

The digital radio of the invention may have further features. In particular, when the digital radio 2 is in communication over the said single radio channel with a second digital radio 4, and the digital radio 2 is transmitting at a lower time division duplex duty cycle than the second digital radio 4, the controller 20 may select a first frame format having time reserved in the first part of the frame for the digital radio 2 to transmit, and time reserved in the second part of the frame for the second digital radio 4 to transmit. Such a frame format is illustrated in the upper trace in FIG. 5. FIG. 5 will be described in more detail below.

Figure 6:
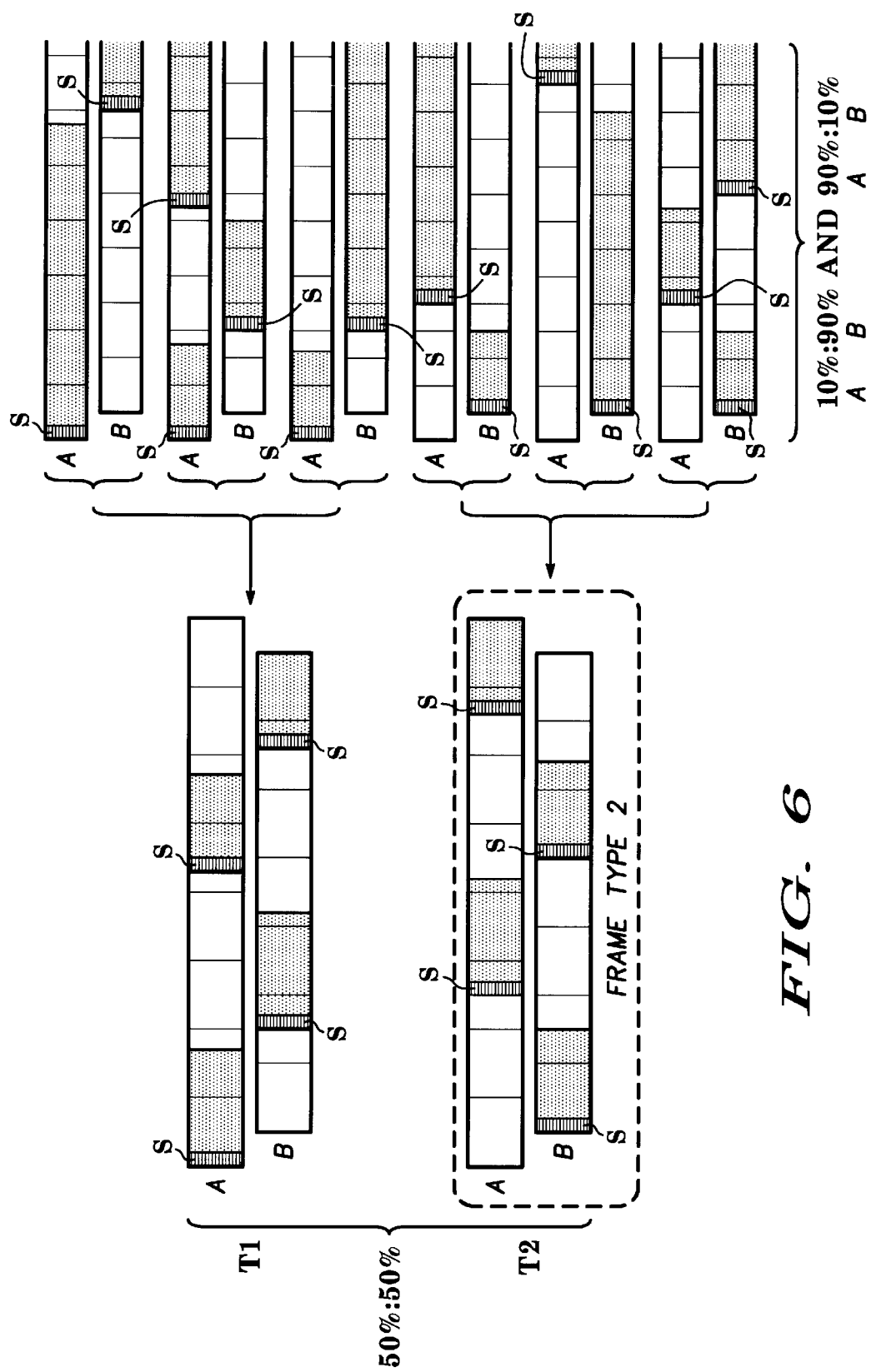

The digital radio of the invention may select a second frame format comprising at least two time slots for the first digital radio 2 to transmit, and at least two time slots for the second digital radio 4 to transmit within each frame, the time slots for the first 2 and second 4 digital radios alternating within the frame. Such a frame structure is illustrated in the upper and lower traces at the centre and left of FIG. 6. FIG. 6 will be described in more detail below.

The advantage of the alternating time slots of FIG. 6, is that the digital radio 2 and the digital radio 4 alternate transmission within the frame, each transmission slot being shorter than that shown in the middle trace on FIG. 4 for an equivalent length of frame. When radio 2 wishes to increase further the proportion of time available to it to transmit, it can initiate this during either of the transmission slots which it has during the alternation shown to the left of FIG. 6. Therefore the maximum time delay before the radio 2 can unilaterally seize extra transmission time amounts to the short time for which radio B is transmitting in the frame format of FIG. 6, left side. Similarly, the second radio 4 can seize extra transmission time at any point during its two transmission slots in the frame.

The digital radio 2 of the invention may select a second frame format having the time slots for the first digital radio 2 to transmit preceding the time slots for the second digital radio 4 to transmit. This is illustrated in FIG. 5, see trace T1.

The digital radio 2 of the invention may select a first frame format which comprises less transmission time for the first digital radio 2 than for the second digital radio 4, and a second frame format which comprises substantially equal transmission times for the first digital radio 2 and for the second digital radio 4. Thus the transition from first to second frame formats would correspond to the state change from the lower right oval to the central oval in FIG. 3. The first frame format may have substantially 20% transmission time for the first radio 2 and substantially 80% transmission time for the second radio 4.

In an alternative embodiment of the inventive digital radio 2 for pseudo-duplex radio communication, digital radio 2 comprises:

(i) Signal transmission means 22, 24 for time division duplex signal transmission over a single radio channel.

(ii) Signal reception means 24, 28 for time division duplex signal reception over the said single radio channel.

(iii) A controller 20, for controlling the signal transmission means 22, 24 and the signal reception means 24, 28, the controller being adapted to transmit and receive signals in a plurality of pre-defined frame formats, each pre-defined frame format having a pre-defined time division duplex duty cycle, the controller being adapted to select the particular one of the plurality of pre-defined frame formats for use over the communication link.

(iv) Wherein, with the digital radio 2 using a second frame format for communication over the said single radio channel with a second digital radio 4, the second frame format comprising substantially equal time for transmission by both the first digital radio 2 and the second digital radio 4, each frame of the second frame format having at least two time slots for the first digital radio 2 to transmit and at least two time slots for the second digital radio 4 to transmit, the time slots for the first and second radios alternating within the frame, during the time slots of the second frame for the first radio 2 to transmit, the controller 20 of the first radio 2 can unilaterally change the pre-defined frame format selected from the second frame format to a third frame format without consulting the second digital radio 4, the third frame format having a higher time division transmitting duty cycle for the first digital radio 2 than the second frame format.

In this embodiment of the invention, the radio 2 is designed to make a transition from the alternating 50%:50% transmission duty cycle to a frame format having a higher transmission duty cycle for the radio 2. The traces to the upper and lower left of FIG. 6 show frame formats with a 50%:50% transmission duty cycle, examples of the 'second' frame format.

The radio 2 may start in a state where it is transmitting with the frame format shown at the upper left of FIG. 6, see trace T1. In this format, the radio 2 (shown as A) transmits in two time slots per frame. These are the first and third time slots, and each precedes a time slot reserved for the second radio 4 (shown as B).

At any time during its two transition time slots, the radio 2 can move to a state where it is transmitting for more than 50% of the time. This is shown in FIG. 6, in the upper half of the right side of the figure.

The digital radio 2 of the invention may have the controller 20 further adapted to derive the value of a source signal activity parameter (VAD) for the digital radio 2 using a soft voice-activity detector, the soft voice-activity detector providing a 2 bit output taking values from 0–3, where 0 represents silence with high confidence and 3 represents active speech with high confidence.

The digital radio 2 of the invention may be a digital portable or mobile radio, and the single radio channel may link the digital radio 2 to the second digital radio 4 via a base station 8. Alternatively however, the single radio channel may be a direct mode radio channel linking the digital radio 2 and the second digital radio 4. The digital radio 2 of the invention may be a digital portable or mobile radio operating in accordance with the DIIS radio standard.

The invention further comprises a digital portable or mobile radio system, comprising at least two radios as described above.

Looking again at FIG. 5, the following points are shown:
(i) The upper trace T1 shows a frame format in which radio A transmits in a first time slot, this being a smaller proportion of the transmission time of the frame than that allotted to radio B.
(ii) The lower trace T2 shows a frame format in which radio B transmits in a first time slot, this being a smaller proportion of the transmission time of the frame than that allotted to radio A.

In both traces shown on FIG. 5, party A is in control of the link and sets the synchronisation etc.

In the upper trace T1, party A is also in control of the duty cycle. This is in accordance with the invention, because party A is transmitting for the smaller proportion of the frame.

In the lower trace T2 on FIG. 5 however, party B is in control of the duty cycle. In fact, party A has allowed party B to transmit first, and has ceded control of the duty cycle to party B. This is in accordance with the invention, because party B is transmitting for the smaller proportion of the frame.

Consider now the relationship between FIGS. 5 and 6.

Trace T1 on FIG. 6 arises when a radio operating with the frame structure of trace T1 of FIG. 5 changes mode to a frame in which both radios have 50% of the transmission time. Notably, trace T1 in FIG. 6 shows that party A transmits first in the frame, as was the case for trace T1 in FIG. 5.

Trace T2 on FIG. 6 arises when a radio operating with the frame structure of trace T2 of FIG. 5 changes mode to a frame in which both radios have 50% of the transmission time. Notably, trace T2 in FIG. 6 shows that party B transmits first in the frame, as was the case for trace T2 in FIG. 5.

In one embodiment of the invention, either radio can change the duty cycle to give itself more transmission time, when the radios' start condition is the frame structure shown in either of traces T1 and T2. A radio can make this change during the slot when it is transmitting. Looking for example at trace T1 on FIG. 6, radio A has two time slots in each frame during which it could change the frame format to one which gave it more transmission time. These are the first and third time slots. If the frames shown in FIGS. 5 and 6 are each 180 ms long, then radio A has substantially 45 ms at the start of the frame where it can decide to increase its transmission time, and also substantially 45 ms more, occurring immediately after 90 ms of the frame have elapsed.

The right edge of FIG. 6 shows various frame structures which the radio of the invention may select if it starts from the frame structures on the left of FIG. 6, and increases the proportion of time in which it transmits.

The upper three traces on the right of FIG. 6 may result for a radio initially operating according to trace T1 on FIG. 6, which moves to increase the proportion of time for which it transmits. The lower three traces on the right of FIG. 6 may result for a radio initially operating according to trace T2 on FIG. 6, which moves to increase the proportion of time for which it transmits.

The frame formats in accordance with various embodiments of the invention shown in FIGS. 5 and 6 may be 180 ms frames. In this case, the invention permits a rapid onset response, which may undercut the 64 ms time after which speech clipping may become noticeable.

The digital radio 2 illustrated in FIG. 2 performs an inventive method. One embodiment of the pseudo-duplex digital radio communication method of the invention comprises:

transmitting a time division duplex signal over a single radio channel;

receiving a time division duplex signal over the single radio channel;

selecting a particular one of a plurality of pre-defined frame formats for use over the single radio channel, each pre-defined frame format having a pre-defined time division duplex duty cycle;

when the digital radio 2 is in communication over the single radio channel with a second digital radio 4 and the digital radio 2 is transmitting at a lower time division duplex duty cycle than the second digital radio 4, unilaterally changing the particular one of the plurality of pre-defined frame formats selected for use over the single radio channel from a first frame format to a second frame format, the second frame format having a higher time division transmitting duty cycle for the digital radio 2 than the first frame format, without consultation with the second digital radio 4.

Another embodiment of the pseudo-duplex digital radio communication method of the invention comprises:

(i) transmitting a time division duplex signal over a single radio channel;

(ii) receiving a time division duplex signal over the single radio channel;

(iii) wherein the transmission and reception are between a first digital radio 2 and a second digital radio 4 and the transmission and reception are in a particular, second one of a plurality of pre-defined frame formats, each pre-defined frame format having a pre-defined time division duplex duty cycle, the second frame format comprising substantially equal time for transmission by both the first digital radio 2 and the second digital radio 4, each frame of the second frame format having at least two time slots for the first digital radio 2 to transmit and at least two time slots for the second digital radio 4 to transmit, the time slots for the first 2 and second 4 radios alternating within the frame; and (iv) during the time slots of the second frame for the first radio 2 to transmit, the first radio 2 can unilaterally change the pre-defined frame format selected, from the second frame format to a third frame format, without consulting the second digital radio 4, the third frame format having a higher time division transmitting duty cycle for the first digital radio 2 than the second frame format.

Speech Coding Recovery

There is a further problem associated with pseudo-duplex radio communications on a single channel, which occurs at a change of transmission mode.

At a transition of mode, the data rate of both of the speech paths changes instantaneously. Due to the inherent delays and complexity of the speech coding process, it is very unlikely that it will be possible to run multiple speech codecs in the encoder in order to overcome these breaks in transmission.

In addition, the inherent memory of speech codecs may mean that once coding has commenced in one mode it may not be possible to change until the next speech frame boundary. The applicant has developed techniques which may be used to minimise the impact of these changes on the perceived synthetic speech.

These techniques may serve to prevent loss of important parts of a user's speech as the user starts to talk into a radio.

50%→90% Case

Consider the case where the first radio 2 has 50% of the transmission time, and the second radio 4 has 50%. Consider the first radio 2 suddenly now taking 90% of the transmission time, leaving only 10% for the second radio 2.

In this case, there are two options. Either the extra data rate available to the codec of the first radio 2 is left un-utilised, or else the additional capacity is devoted to transmitting additional error correction redundancy.

90%→50% Case

Consider the case where the first radio 2 has 90% of the transmission time, and the second radio 4 has only 10%. Consider the second radio 4 suddenly now taking 50% of the transmission time, leaving only 50% for the first radio 2.

In this case, the options depend upon the reason for the transition.

(i) The switch in capacity may be due to a speech onset which cannot now be fully serviced, such as a situation where both parties are speaking at the same time. In this case, as much of the speech onset as possible should be conveyed. This will probably mean sending a smaller number of frames, although in some cases all of the frames after an onset may be sent. It is clear that the position of these frames must also be conveyed to the decoder to allow accurate synthesis.

In other cases where the onset appears towards the beginning of a frame, it will be necessary to drop one or two frames after the onset and rely upon error mitigation to fill-in the speech. The applicant has realised that this could be performed selectively to minimise the impact on quality. This would be particularly attractive where a steady-state vowel extended over several speech coder frames. In this case, some frames could be omitted from the transmission without serious clipping in the speech. It should be noted that in the case of both parties talking at the same time, double-talk, the quality of the speech will not be fully appreciated by the listener if they are also speaking and side-tone is present.

(ii) Where the switch in capacity is due to the second caller beginning to speak, the same theories may be applied. However, in this case, speech coder frames must be dropped in order to meet the capacity restrictions and if possible this should be performed intelligently and with minimum duration breaks to maximise the perceived quality.

What is claimed is:

1. A digital mobile or portable radio for pseudo-duplex radio communication with another mobile or portable radio, comprising:

signal transmission means for time division duplex signal transmission over a single radio channel;

signal reception means for time division duplex signal reception over the said single radio channel;

a controller, for controlling the signal transmission means and the signal reception means, the controller being adapted to transmit and receive signals in a plurality of pre-defined frame formats, each pre-defined frame format having a different pre-defined time division duplex duty cycle, the controller being adapted to select the particular one of the plurality of pre-defined frame formats for use over the communication link;

and a voice activity detector operably coupled to the controller to provide to the controller an output having more than two possible values each indicating a different speech of a user being present, wherein the controller is operable, when the digital radio is in communication over the single radio channel directly with a second portable or mobile radio and the radio is transmitting with a lower duty cycle than the second radio, to change, in response to an output of the voice activity detector having a value indicating that speech is likely to be present, the time division transmitting duty cycle for the digital radio to one which is higher than that of the second radio without sending a message to consult the second digital radio.

2. A digital radio in accordance with claim 1, wherein with the digital radio in communication over the said single radio channel with a second digital radio and the digital radio transmitting at a lower time division duplex duty cycle than the second digital radio, the controller is adapted to select a first frame format having time reserved in the first part of the frame for the digital radio to transmit, and time reserved in the second part of the frame for the second digital radio to transmit.

3. A digital radio in accordance with claim 1, wherein the second frame format comprises at least two time slots for the first digital radio to transmit and at least two time slots for the second digital radio to transmit within each frame, the time slots for the first and second digital radios alternating within the frame.

4. A digital radio in accordance with claim 3, wherein the second frame format further comprises the time slots for the first digital radio to transmit preceding the time slots for the second digital radio to transmit.

5. A digital radio in accordance with claim 1, wherein the first frame format comprises less transmission time for the first digital radio than for the second digital radio, and the second frame format comprises substantially equal transmission times for the first digital radio and for the second digital radio.

6. A digital radio in accordance with claim 1, wherein the controller is further adapted to select a first pre-defined frame format having substantially 20% transmission time for the first radio and substantially 80% transmission time for the second radio.

7. A digital radio in accordance with claim 1, wherein the voice activity detector comprises a soft voice-activity detector providing a 2 bit output taking values from four possible values in the range 0–3, where 0 represents silence with high confidence and 3 represents active speech with high confidence; and the controller is adapted to derive the value of a source signal activity parameter (VAD) for the digital radio using an output from the soft voice activity detector.

8. A digital radio in accordance with claim 1, wherein the digital radio is operating in accordance with the DIIS radio standard.

9. A digital portable- or mobile radio system, comprising at least two mobile or portable radios in accordance with claim 1.

10. A digital portable or mobile radio for pseudo-duplex radio communication, comprising:
(i) signal transmission means for time division duplex signal transmission over a single radio channel;
(ii) signal reception means for time division duplex signal reception over the said single radio channel;
(iii) a controller, for controlling the signal transmission means and the signal reception means, the controller being adapted to transmit and receive signals in a plurality of pre-defined frame formats, each pre-defined frame format having a pre-defined time division duplex duty cycle, the controller being adapted to select the particular one of the plurality of pre-defined frame formats for use over the communication link; and
(iv) a voice activity detector operable coupled to the controller to provide to the controller an output having more than two possible values each indicating a different likelihood of speech of a user being present,
wherein, with the digital radio using a second frame format for communication over the said single radio channel with a second digital radio, the second frame format comprising substantially equal time for transmission by both the first digital radio and the second digital radio, each frame of the second frame format having at least two time slots for the first digital radio to transmit and at least two time slots for the second digital radio to transmit, the time slots for the first and second radios alternating within the frame, during the time slots of the second frame for the first radio to transmit, the controller of the first radio can in response to the output of the voice activity detector unilaterally change the pre-defined frame format selected, from the second frame format to a third frame format, without consulting the second digital radio, the third frame format having a higher time division transmitting duty cycle for the first digital radio than the second frame format.

11. A digital radio in accordance with claim 10, wherein the voice activity detector comprises a soft voice-activity detector providing a 2-bit output taking values from four possible values in the range of 0–3, where 0 represents silence with high confidence and 3 represents active speech with high confidence; and the controller is adapted to derive the value of a source signal activity parameter (VAD) for the digital radio using an output from the soft voice-activity detector, the soft voice-activity detector providing a 2 bit output taking values from 0–3, where 0 represents silence with high confidence and 3 represents active speech with high confidence.

12. A digital radio in accordance with claim 10, wherein the digital radio is a digital portable or mobile radio, and the single radio channel links the digital radio to the second digital radio via a base station.

13. A digital radio in accordance with claim 10, wherein the digital radio is a digital portable or mobile radio, and the single radio channel is a direct mode radio channel linking the digital radio and the second digital radio.

14. A digital radio in accordance with claim 10, wherein the digital radio is a digital portable or mobile radio operating in accordance with the DIIS radio standard.

15. A digital portable- or mobile radio system, comprising at least two radios in accordance with claim 10.

16. A method of pseudo-duplex digital radio communication, comprising:
transmitting a time division duplex signal over a single radio channel;
receiving a time division duplex signal over the said single radio channel;
selecting a particular one of a plurality of pre-defined frame formats for use over the single radio channel, each pre-defined frame format having a pre-defined time division duplex duty cycle;
when a digital radio is in communication over the said single radio channel with a second digital radio and the digital radio is transmitting at a lower time division duplex duty cycle than the second digital radio,
in response to an output from a voice activity detector having at least three different output values each indicating a different likelihood of speech of a user being present unilaterally changing the particular one of the plurality of pre-defined frame formats selected for use over the single radio channel from a first frame format to a second frame format, the second frame format having a higher time division transmitting duty cycle for the digital radio than the first frame format, without consultation with the second digital radio.

17. A method of pseudo-duplex digital radio communication between a first mobile or portable radio and a second mobile or portable radio, comprising:
(i) transmitting a time division duplex signal over a single radio channel;
(ii) receiving a time division duplex signal over the said single radio channel;
(iii) wherein the transmission and reception are in a particular, second one of a plurality of pre-defined frame formats, each pre-defined frame format having a pre-defined time division duplex duty cycle, the second frame format comprising substantially equal time for transmission by both the first digital radio and the second digital radio, each frame of the second frame format having at least two time slots for the first digital radio to transmit and at least two time slots for the second digital radio to transmit, the time slots for the first and second radios alternating within the frame; and (iv) during the time slots of the second frame for the first radio to transmit, the first radio can, in response to an output from a voice activity detector having at least three different output values each indicating a different likelihood of speech of a user being present, unilaterally change the pre-defined frame format selected, from the second frame format to a third frame format, without consulting the second digital radio, the third frame format having a higher time division transmitting duty cycle for the first digital radio than the second frame format.

* * * * *

UNITED STATES PATENT AND TRADEMARK OFFICE
CERTIFICATE OF CORRECTION

PATENT NO. : 6,724,735 B1 Page 1 of 1
DATED : April 20, 2004
INVENTOR(S) : Gibbs et al.

It is certified that error appears in the above-identified patent and that said Letters Patent is hereby corrected as shown below:

<u>Column 12,</u>
Lines 40 and 41, change "more than two possible values each indicating a different speech of a user being present." to -- more than two possible values each indicating a different likelihood of speech of a user being present, --.

Signed and Sealed this

Thirtieth Day of May, 2006

JON W. DUDAS
*Director of the United States Patent and Trademark Office*